United States Patent [19]

Norsworthy

[11] Patent Number: 4,728,804
[45] Date of Patent: Mar. 1, 1988

[54] SCANNING SYSTEM WITH LOW SAMPLING RATE

[75] Inventor: Keith H. Norsworthy, Bellevue, Wash.

[73] Assignee: The Boeing Company, Seattle, Wash.

[21] Appl. No.: 947,859

[22] Filed: Dec. 30, 1986

[51] Int. Cl.[4] .............................................. G02B 26/10
[52] U.S. Cl. .................................... 250/578; 250/334; 358/113
[58] Field of Search ................. 250/203 R, 334, 347, 250/349, 578; 244/3.16; 358/113, 199, 213.26, 293, 294

[56] References Cited

U.S. PATENT DOCUMENTS

| | | | |
|---|---|---|---|
| 3,324,296 | 6/1967 | Powell | 250/203 R |
| 3,591,714 | 7/1971 | Guildford | 358/112 |
| 3,723,642 | 3/1973 | Laakmann | 358/166 |
| 4,017,732 | 4/1977 | Runciman | 250/334 |
| 4,054,797 | 10/1977 | Milton et al. | 250/332 |
| 4,155,007 | 5/1979 | Beckmann | 250/342 |
| 4,193,688 | 3/1980 | Watkins | 244/3.16 |
| 4,204,122 | 5/1980 | Menke | 250/334 |
| 4,262,199 | 4/1981 | Bridges et al. | 250/342 |
| 4,327,377 | 4/1982 | Takken | 250/334 |
| 4,403,148 | 9/1983 | Coon et al. | 250/334 |
| 4,560,869 | 12/1985 | Hien et al. | 250/235 |

Primary Examiner—David C. Nelms
Assistant Examiner—Stephone B. Allen
Attorney, Agent, or Firm—Finnegan, Henderson, Farabow, Garrett & Dunner

[57] ABSTRACT

A scanning infrared sensor scans an array of detector elements across a field of view and samples the detector elements at a predetermined rate. The detector elements are sampled with a common sample frequency and with predetermined time phase values, are processed through delay elements such that the delayed detector output signal values are out of time phase, and are supplied to a multiplexer. The multiplexer produces a series of discrete signals at equal time intervals having an effective sample rate which is a multiple of the individual detector element sample rate, thereby reducing the complexity of processing circuitry, the number of interconnections required between the focal plane array and on-gimbal circuitry, and the size and weight of delay elements.

13 Claims, 13 Drawing Figures

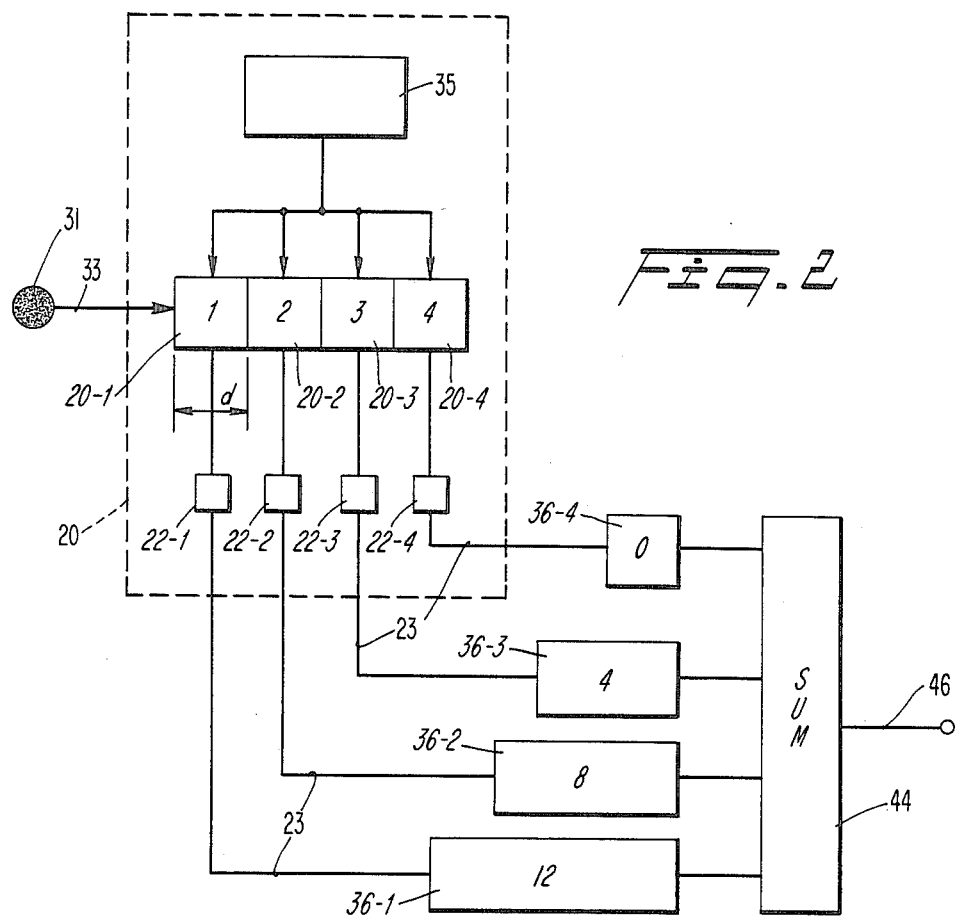
Fig. 2
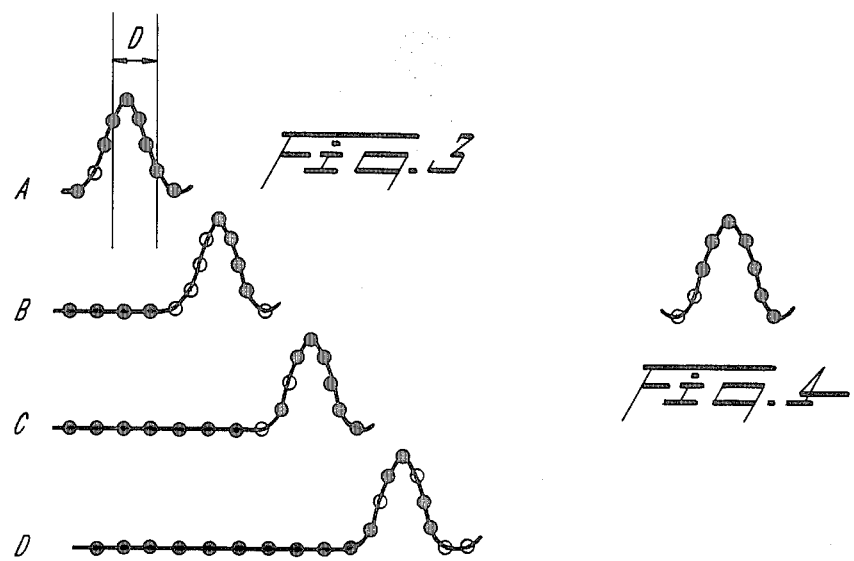
Fig. 3
Fig. 4

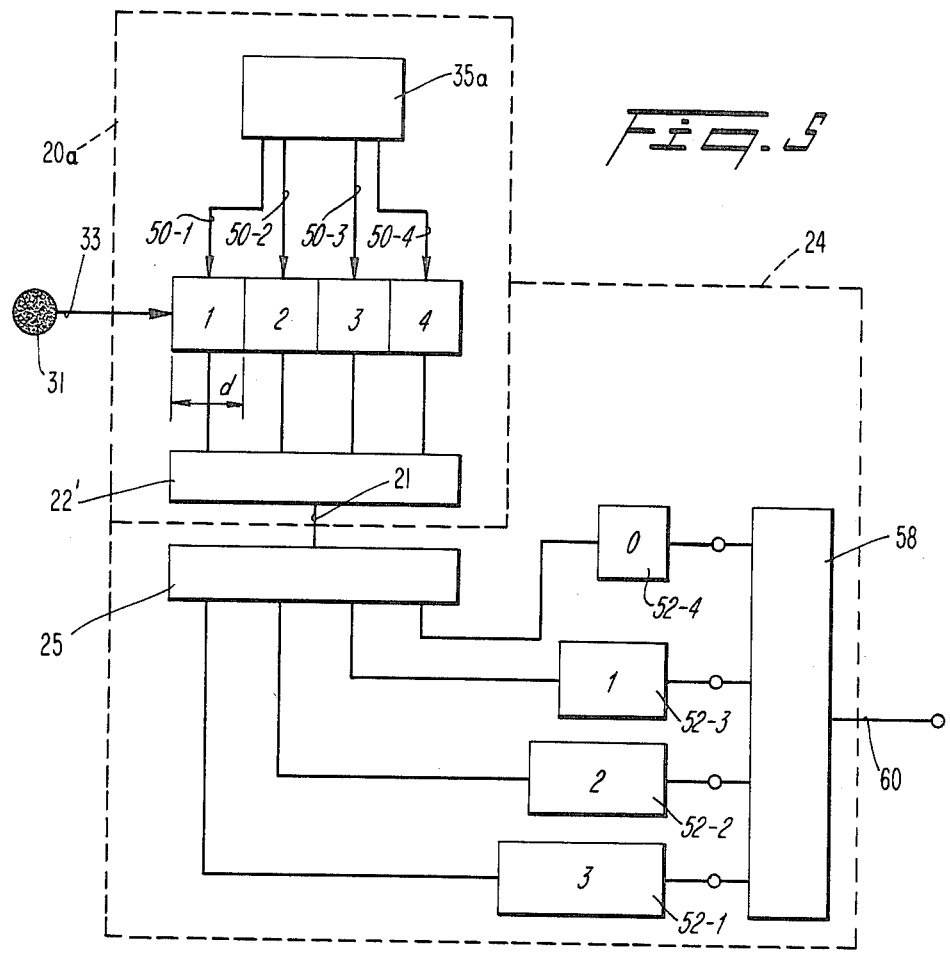
Fig. 5
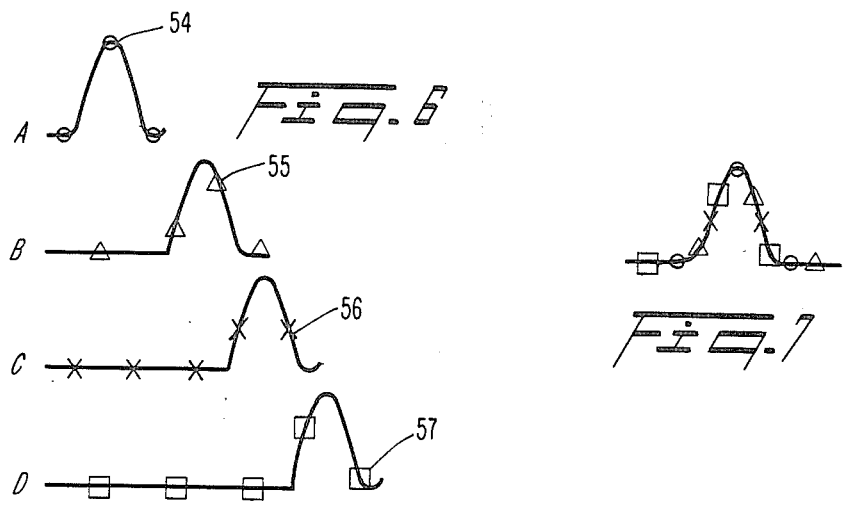
Fig. 6
Fig. 7

SCANNING SYSTEM WITH LOW SAMPLING RATE

BACKGROUND

The invention relates to sensor systems and, more particularly, to non-imaging scanning sensor systems.

Non-imaging scanning systems are employed in many applications where it is desired to detect the presence of objects of interest. For example, non-imaging scanning systems employing an array of infrared detector elements positioned in the focal plane of a scanning optical system are used to passively detect the presence of vehicles at extended distances. Such systems initially employed a single column of detector elements arranged in a line array at the focal plane of an optics system. The line array is mounted in a gimballed sensor unit to scan a portion of a field of view and produce detector output signals which are sampled and multiplexed for further processing by on-gimbal circuitry. An improvement to basic line array systems, known as Time Delay Integration (TDI), employs a plurality of detector elements adjacently positioned in the focal plane in the scan direction. Each detector element is sampled in-phase and the resultant sampled signal is applied to a delay circuit having a delay value representative of the position of the connected detector element in the scan direction. The outputs of the delay circuits are superimposed in time and summed to provide an output signal from the TDI array having an improved signal to noise ratio compared to line arrays.

It is well known that the performance of TDI systems can be improved by increasing the number of detector elements mounted in the focal plane of the optical system. Advances in semiconductor technology now provide arrays of hundreds or even thousands of infrared detector elements, and future advances providing even larger arrays of detector elements will provide further increases in system performance. Such large numbers of detector elements in the past, however, have called for a very high sampling rate of the detector elements. This has resulted in a corresponding increase in the complexity of processing circuitry. An even more limiting factor is the large number of interconnections which are required to carry output signals from large detector element arrays to circuitry mounted within the sensor unit, known as on-gimbal circuitry. Moreover, prior art sensor methods and apparatus employing large TDI detector element arrays have required correspondingly large delay circuits. This also increases the size, complexity, and weight of apparatus mounted in the sensor unit.

Various techniques are known for improving the performance of the basic TDI system. For example, it is well known to provide a second array of detector elements offset in the cross-scan direction by an amount equal to one-half the cross-scan dimension of each detector element. This provides a spatial sample rate which is double the sample rate in the cross scan direction obtainable with only a single array of detector elements.

Another method of increasing the performance of prior art TDI systems involves the introduction of a progressively increasing phase shift in the relative timing of the sampling signals and initial contact of the image at successive detector elements. The composite output signal of the array then corresponds to an average over all possible relative timings of sampling signals and initial contact of the image at a detector element. This method is shown, for example, in U.S. Pat. No. 4,327,377 to Takken issued Apr. 27, 1982.

Smaller delay lines, lower complexity circuitry, and fewer connections between the focal plane and on gimbal circuitry could be provided by lowering the detector element sample rate. However, reducing the effective sample rate of the system results in a degradation in system performance, since the Nyquist theorem specifies that a waveform having a given frequency, such as a detector output signal produced by a target object, must be sampled at a rate no less than twice that frequency in order to faithfully reproduce the waveform. Thus, reduction of the effective sample rate of the output signal of the scanning system would result in a loss of ability to detect and accurately track small amplitude targets. None of the methods and apparatus involving time delay integration of the prior art are thus completely satisfactory in reducing the circuit complexity and interconnection requirements of scanning systems, while maintaining the desired level of sensor performance.

SUMMARY OF THE INVENTION

It is therefore an object of the present invention to provide a scanning sensor system incorporating a large detector element array which utilizes less complex circuitry than prior art methods and apparatus.

It is a further object of the present invention to provide a scanning sensor system having smaller delay lines.

It is yet another object of the present invention to provide a scanning sensor system requiring fewer interconnections between the focal plane array and on-gimbal components of the system.

It is yet another object of the present invention to provide a scanning sensor system having a high effective detector sampling rate and a low actual detector sampling rate.

The present invention overcomes the problems and disadvantages of the prior art by providing a scanning sensor system having a high effective detector element sample rate yet a low actual detector element sample rate by sampling each detector element at a slower rate than the prior art in a predetermined time phase relationship with other detector elements, delaying the detector element output signal values with delay lines having a smaller delay value than the prior art such that the delayed detector output signal values are out of time phase with delayed values from other detectors, and multiplexing, rather than summing, the outputs of the delay lines.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a scanning sensor system of this invention comprises a detector array including a plurality of detector elements positioned at a predetermined spacing in a focal plane and means for scanning the array across a field of view. Each of the detector elements is adapted when sampled to produce a detector output signal value representative of the integrated energy of the radiation applied to the detector element since the detector element was last sampled.

The invention further comprises means for generating sampling signals to sample each of the detector elements, the sampling signals for each of the detector elements being identical in frequency and having a predetermined time phase relationship. The invention further comprises a plurality of delay means each connected to one of the detector elements for delaying the detector output signal values of the connected detector element by a predetermined delay value such that the delayed detector output signal values are out of time phase. The invention also comprises multiplexer means connected to each of the delay means for time multiplexing the delayed detector signal values as discrete signals on a single multiplexer output terminal.

BRIEF DESCRIPTION OF THE DRAWINGS

FIG. 2 is a detailed block diagram of focal plane array and processing apparatus of FIG. 1, employing prior art time delay integration techniques;

FIGS. 3A, 3B, 3C, and 3D show the waveforms produced by detector elements in the prior art apparatus of FIG. 2;

FIG. 4 shows the waveform of a summation output signal obtained from the apparatus of FIG. 2;

FIG. 5 is a block diagram of focal plane and processing apparatus of FIG. 1, employing the principles of the present invention;

FIGS. 6A, 6B, 6C, and 6D are similar to FIGS. 3A–3D, respectively, but show the waveforms produced by detector elements using the techniques of the present invention; and FIG. 7 is similar to FIG. 4, but shows the waveform produced by the output terminal of multiplexer circuitry of FIG. 5.

DESCRIPTION OF THE PREFERRED EMBODIMENTS

Figure 1:
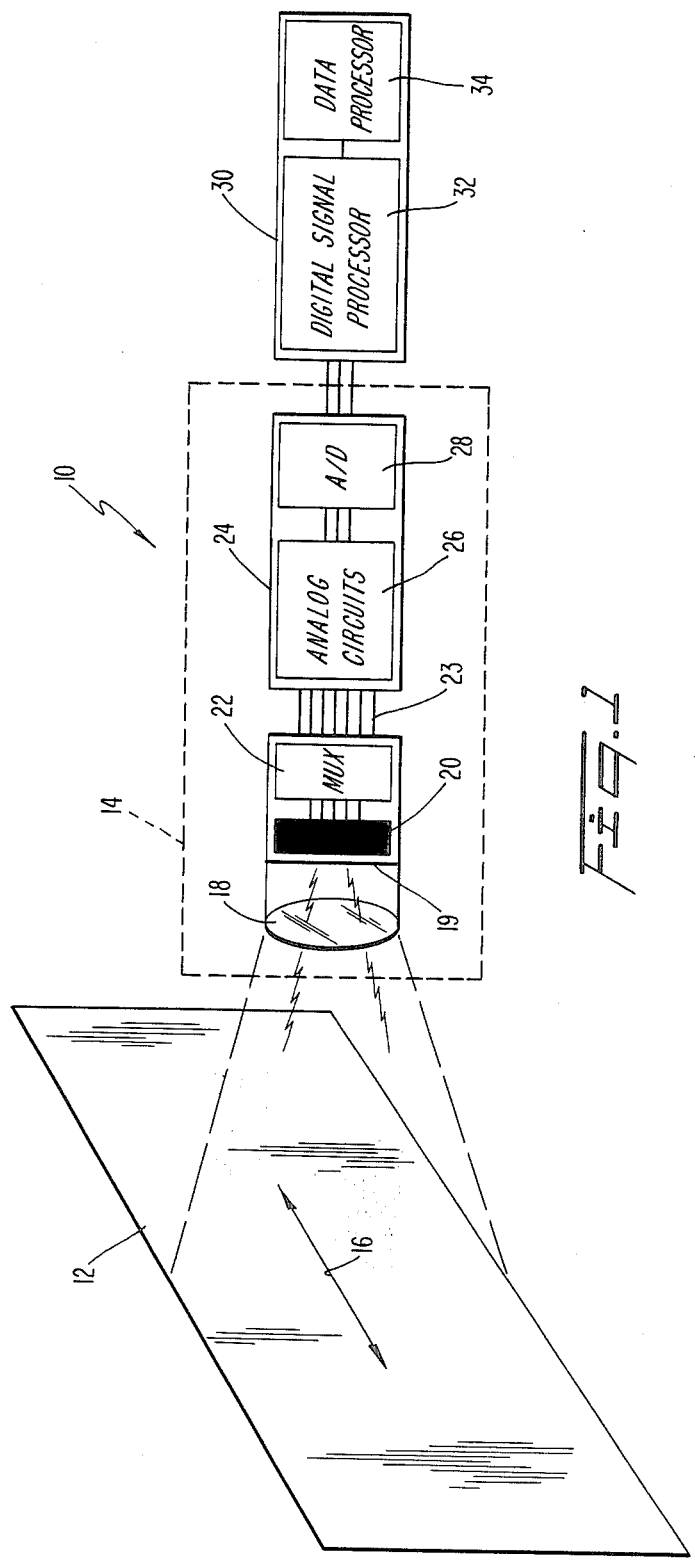
FIG. 1 is a block diagram of a scanning infrared sensor system of the type which may employ the principles of the present invention.

Referring now to the drawings, in which corresponding reference characters refer to corresponding elements, FIG. 1 shows a non-imaging scanning system 10 for detecting objects in a two-dimensional field of view 12. System 10 includes a movable sensor unit 14 having an optical system shown schematically at 18 for focusing radiation from field of view 12 upon an infrared array 20 located in the focal plane 19 of optical system 18.

The outputs of array 20 are connected through multiplexing circuitry 22 over interconnect cables 23 to processing circuitry 24 which amplifies and digitizes the output of multiplexer unit 22 by analog circuitry 26 and an analog-to-digital converter 28.

Sensor unit 14 is movably mounted upon a gimbal assembly (not shown) to permit sensor unit 14 to be scanned in an oscillatory manner in a direction indicated by arrow 16. Processing circuitry 24 will therefore be referred to hereinafter as "on-gimbal" circuitry. Output signals from on-gimbal circuitry 24 are connected over cables to off-gimbal circuitry 30 consisting of a digital signal processor 32 and a data processor 34 for noise suppression, target detection, and tracking.

FIG. 2 shows a more detailed block diagram of array 20 to illustrate the operation of the prior art TDI technique. As can be seen in FIG. 2, a blur spot 31 formed by optical system 18 from radiation generated by an infrared source in field of view 12 is scanned to produce relative motion in a direction indicated by arrow 33 across array 20 consisting of detector elements 20-1, 20-2, 20-3, and 20-4 by motion of sensor unit 14. Adjacently positioned detector elements 20-1 through 20-4 have a width d and an effective separation distance of d.

A sampling signal generator 35 provides sampling signals to detector elements 20-1 through 20-4. Detector elements 20-1 through 20-4 each consists of infrared detector elements adapted when sampled to produce a detector output signal value representative of the integrated energy of radiation applied to the detector element since the detector element was last sampled. For purposes of clarity, array 20 is shown in FIG. 2 to comprise only four individual detector elements. In practice, however, detector elements 20-1 through 20-4 each comprise a column of adjacent detector elements extending in the cross-scan direction perpendicular to arrow 33.

Output signal values from detector elements 20-1 through 20-4 are provided through a plurality of multiplexer units 22-1, 22-2, 22-3, and 22-4. That is, the output of each detector element in a column represented by each detector element 20-1 through 20-4 of FIG. 2 is provided to a respective multiplexer unit where it is time multiplexed onto a respective connector 23. Connectors 23 are supplied to delay lines 36-1, 36-2, 36-3, and 36-4. Delay lines 36-1 through 36-4 typically consist of shift registers which delay the detector output signal values of connected detector elements by a predetermined delay value and supply such delayed detector output signal values to a summation circuit 44. As can be seen in FIG. 2, the delay values provided by delay lines 36-1 through 36-4 are a function of the position of the respective connected detector element within the array. Summation circuit 44 then provides a signal on output terminal 46 representing a summation of the delayed detector output signals superimposed in time.

Blur spot 31 is scanned across the array of detectors 20-1 through 20-4 at a predetermined scan rate r and remains on each detector 20-1 through 20-4 for a time D known as the dwell time. Dwell time D is more precisely equated to the separation between detectors d divided by scan rate r; that is, $D=d/r$.

In a typical TDI system, each detector is sampled two or more times during each dwell time D. In the example shown in FIG. 2, each detector 20-1 through 20-4 is sampled four times during each dwell time D; that is, a sample rate S is equal to four samples per dwell time D. Delay values of delay lines 36-1 through 36-4 are equal to integer multiples of the sampling interval of sampling signals produced by generator 35.

Detector output signal values from detector element 20-1 generated in response to sampling signals from sample generator 35 are supplied to delay element 36-1 and delayed for a time period equal to twelve sample intervals. Detector output signal values produced from detector element 20-2 are supplied to delay line 36-2 and are delayed for a time period equal to eight sample intervals. Detector output signal values produced from detector element 20-3 are supplied to delay line 36-3 and are delayed for a time period equal to four sample intervals. Detector output signal values produced from detector element 20-4 are supplied to delay line 36-4 and are delayed for a time period of zero sample intervals. The outputs of delay lines 36-1 through 36-4 are thus superimposed in time. They are supplied to summation circuit 44 where they are summed and provided as a combined TDI summation signal on terminal 46, as shown in FIG. 4.

The waveforms produced by detector elements 20-1 through 20-4 are respectively shown in graphs A-D of FIG. 3. The time of occurrence of sampling signals from sample generator 34 is also indicated in FIG. 3 by small circles superimposed on graphs A-D. As can be seen in FIG. 3, detector elements 20-1 through 20-4 are sampled in phase at a rate of four samples per dwell. Since detector elements 20-1 through 20-4 are sampled in phase, and since delay values of delay lines 36-1 through 36-4 are each equal to integer multiples of sample intervals, it can be seen that the effective sampling rate of the combined output signal shown in FIG. 4 is four samples per dwell, identical to the sample rate of individual detector elements 20-1 through 20-4.

Referring now to FIG. 5, there is shown a block diagram of an array 20a, corresponding generally in function to array 20 shown in FIGS. 1 and 2, which constitutes a preferred embodiment of the present invention. Array 20a also includes adjacently positioned detector elements 20-1 through 20-4 having a width and effective separation distance d.

The invention includes means for scanning the array across a field of view. As embodied herein, the scanning means comprises sensor unit 24 including optical system 18, mounted on gimbals, and oscillated across a field of view. The structure of gimbal mounts for oscillating sensor unit 24 and details of optical system 18 are well-known in the art and will not be described herein in detail.

The invention includes means for generating sampling signals to sample each of said detector elements, the sampling signals for each of said detector elements being identical in frequency and having a predetermined time phase relationship. As embodied herein, the sampling means comprises a sample signal generator 35a, similar in function to sample signal generator 35. However, instead of a single common output supply to each of detector elements 20-1 through 20-4, sample signal generator 35a includes four separate output terminals 50-1 through 50-4. Output terminals 50-1 through 50-4 provide sampling signals to respective detector elements 20-1 through 20-4 which are identical in frequency and sampling interval, but which are delayed in phase by a predetermined time phase amount. Terminals 50-1 through 50-4 provide only a single sampling signal to each detector element 20-1 through 20-4 during each dwell time D.

The detector output signal values are supplied to a multiplexer circuit 22'. As discussed above, each detector element in FIG. 5 represents a column of identical detector elements whose outputs are supplied to multiplexer circuit 22'. As will be explained below, the rate at which detector output signal values are produced in the present invention is considerably reduced in comparison with the prior art. Therefore, the complexity of multiplexer circuit 22' is significantly reduced as compared to units 22 and the number of connectors 23 is significantly reduced.

Connector 23' is supplied to a demultiplexer circuit 25 which splits the signal stream supplied over connector 23' into four outputs representing the signal stream supplied to multiplexer circuit 22'.

The invention includes a plurality of delay means each coupled to one of the detector elements for delaying the detector output signal values of the coupled detector element by a predetermined delay value such that the delayed detector output signal values are out of time phase. As embodied herein, the delay means comprise delay elements 52-1 through 52-4 coupled to respective detector elements 20-1 through 20-4 through multiplexer circuit 22' and demultiplexer circuit 25. Delay elements 52-1 through 52-4 are similar in function to delay lines 36-1 through 36-4, but require a significantly reduced circuit count. Specifically, with a sample rate of one sample per dwell, delay elements 52-1 through 52-4 provide respective delay values equal to three sample intervals, two sample intervals, one sample interval, and zero.

The waveforms of detector elements 20-1 through 20-4 with sampling signals provided by terminals 50-1 through 50-4, respectively, are respectively shown in graphs A through D of FIG. 6. For purposes of clarity, the times of occurrence of sampling signals in graphs A through D of FIG. 6 are respectively shown by small circles, triangles, crosses, and squares superimposed on respective waveforms of detector elements 20-1, 20-2, 20-3 and 20-4. It can be seen that the waveforms in each graph A-D of FIG. 6 have sampling signals applied thereto at the same rate, but with a constant time phase difference therebetween. For example, a sampling signal 54 has been generated at the peak of the waveform produced by passage of blur spot 31 across detector element 20-1 of FIG. 5. A corresponding waveform produced by passage of blur spot 31 across detector element 20-2 is shown in graph B of FIG. 6. As can be seen, however, a sampling signal 55 arrives not at the peak of the signal produced by blur spot 31 on detector element 20-2 as in graph A, but rather delayed by a phase value proportional to 1/N. Since array 20a has four detector elements the phase value of array 20a is equal to D/4. Similarly, passage of blur spot 31 across detector element 20-3 will produce the waveform shown in graph C of FIG. 6. A corresponding sampling signal 56 is delayed from sampling signal 55 by a phase value equal to D/4. Similarly, passage of blur spot 31 across detector element 20-4 will produce the waveform shown in graph D of FIG. 6. As can be seen therein, a corresponding sampling signal 57 is supplied to detector element 20-4 with a phase delay equal to D/4, as compared to sampling signal 56.

Detector output signal values produced by sampling signals applied to detector elements 20-1 through 20-4 are respectively supplied to delay elements 52-1 through 52-4, where they are delayed by delay values indicated in FIG. 5. Since detector elements 20-1 through 20-4 are sampled out of time phase, the delayed detector output signal values are out of time phase.

The invention includes multiplexer means connected to each of said delay means for time multiplexing the delayed detector signals as discrete signals on a single multiplexer output terminal. As embodied herein, the multiplexer means includes a multiplexer circuit 58. The outputs of delay lines 52-1 through 52-4 are supplied to multiplexer circuit 58, which provides time multiplexing of delay detector signals to produce the delayed detector signals as discrete signals on a single multiplexer output terminal 60. Since the spacing of detector elements 20-1 through 20-4 is uniform, the sampling frequency and the time phase differences of sampling signals applied to adjacent detector elements 20-1 through 20-4 are identical, and the delay values of delay elements 52-1 through 52-4 are integer multiples of the sampling interval, the delayed detector output signal values are out of time phase and the discrete output signals appearing on terminal 60 are equally spaced in time with time separation D/4. The output signals appear on terminal 60 at a rate proportional to Nd/r where N is greater than unity. In the preferred embodiment such signals appear at a rate of 4d/r. It can be readily understood, however, that such out of phase delayed signals and equal time spacing can be provided even if one of the conditions of the preceding sentence is not present, by corresponding variations in one or more of the other conditions. For example, if the equally spaced detector elements 20-1 through 20-4 are all sampled in phase with a sample interval of 0.75D or 1.25D out of phase delayed signals and equal time spacing of the signals on terminal 60 is maintained using the previously described integer delay values of 3, 2, 1, and 0.

The waveform of the multiplexed detector output signal values appearing on terminal 60 is shown in FIG. 7. As can be seen therein, the resultant waveform is identical to the TDI summation signal shown in FIG. 4, produced by prior art TDI summation methods. The present invention thus provides a sensor output signal having a high effective sampling rate, exceeding the well-known Nyquist sample rate requirement, while using a low actual sampling rate supplied to individual detector elements.

As discussed above, the complexity, weight, and expense of analog signal conditioning circuitry and the number of interconnections required between multiplexer 22 and on-gimbal circuitry 24 is directly proportional to the total array sample rate. By limiting the actual sample rate of each detector element, the present invention provides for a corresponding decrease in cost and complexity of multiplexer 22' and a reduction in the number of interconnections between multiplexer 22' and on-gimbal circuitry 24.

It will be apparent to those skilled in the art that various modifications and variations can be made to the scanning system of the present invention without departing from the scope and spirit of the invention. As an example, each detector element 20-1 through 20-4 of FIG. 5 may be replaced by a TDI subset of multiple detector elements. The detector output signals of each subset would be sampled at a low actual sample rate, below the Nyquist requirement, and processed by reduced delay line TDI techniques to obtain a summation signal, and the resulting summation signals from each TDI subset corresponding to detector elements 20-1 through 20-4 would then be processed according to the principles shown in FIG. 5. Moreover, each TDI subset may include staggered pairs of TDI subsets to provide a higher spatial sampling rate in the cross-scan direction. Thus it is intended that the present invention cover the modifications and variations of this invention, provided that they come within the scope of the appended claims and their equivalents.

I claim:

1. A scanning sensor system comprising:
    a detector array including a plurality of detector elements positioned at a predetermined spacing in a focal plane, each of said detector elements adapted when sampled to produce a detector output signal value representative of the integrated energy of said radiation applied to said detector element since said detector element was last sampled;
    means for scanning said array across a field of view;
    means for generating sampling signals to sample each of said detector elements, the sampling signals for each of said detector elements being identical in sampling frequency and having a predetermined time phase relationship;
    a plurality of delay means each coupled to one of said detector elements for delaying said detector output signal values of said coupled detector element by a predetermined delay value such that said delayed detector output signal values are out of time phase; and
    multiplexer means connected to each of said delay means for time multiplexing said delayed detector signal values as discrete signals on a single multiplexer output terminal.

2. A system as recited in claim 1 wherein said detector spacing, said sampling frequency, said time phase relationship, and said delay values are selected such that said discrete signals are equally spaced in time.

3. A system as recited in claim 2 wherein each of said delay values is representative of the relative position of an associated detector element within said array.

4. A system as recited in claim 3 wherein said array comprises N detector elements and said phase values are proportional to 1/N.

5. A system as recited in claim 4 wherein said scanning means has a scan rate r, said detector elements have a separation d, and said discrete signals are produced at said multiplexer output terminal at a rate proportional to Nd/r, where N is greater than unity.

6. A system as recited in claim 2 wherein said sampling signals applied to adjacent ones of said detector elements differ in phase by a predetermined time phase value.

7. A system as recited in claim 2 wherein said scanning means scans said array such that each detector has a dwell time D, said sampling means samples said detector elements with a sample interval which is a non-integer multiple of said dwell time, and said predetermined delay values are integer multiple of said sample interval.

8. A method for producing signals representative of radiation emitted by objects of interest, comprising the steps of:
    scanning an array of detector elements across a field of view, said detector elements having a predetermined spacing in a focal plane;
    integrating the energy of radiation from objects in said field of view on said detector elements;
    applying sampling signals to each detector element to produce detector output signal values representative of the integrated energy of said radiation applied to said detector element since said detector element was last sampled, the sampling signals for each of said detector elements being identical in frequency and having a predetermined time phase relationship;
    delaying each of said detector output signal values by a predetermined delay value to produced delayed detector output signals which are out of time phase; and
    multiplexing said delayed detector signal values as discrete signals on a single multiplexer output terminal.

9. A method as recited in claim 8 wherein said detector element spacing, said sampling frequency, said time phase relationships, and said delay values are selected such that said discrete signals are equally spaced in time.

10. A method as recited in claim 9 wherein each of said delay values is representative of the relative position of an associated detector element within said array.

11. A method as recited in claim 10 wherein said array has N detector elements and said phase values are proportional to 1/N.

12. A method as recited in claim 11 wherein said scanning step is performed at a rate r, said detector elements have a spacing d, and said discrete signals are produced at a rate proportional to Nd/r, where N is greater than unity.

13. A method as recited in claim 9 wherein said detector elements are sampled out of time phase.

* * * * *